(No Model.) 2 Sheets—Sheet 1.
E. J. BYRNE.
APPARATUS FOR PRODUCING VACUUM.
No. 564,554. Patented July 21, 1896.
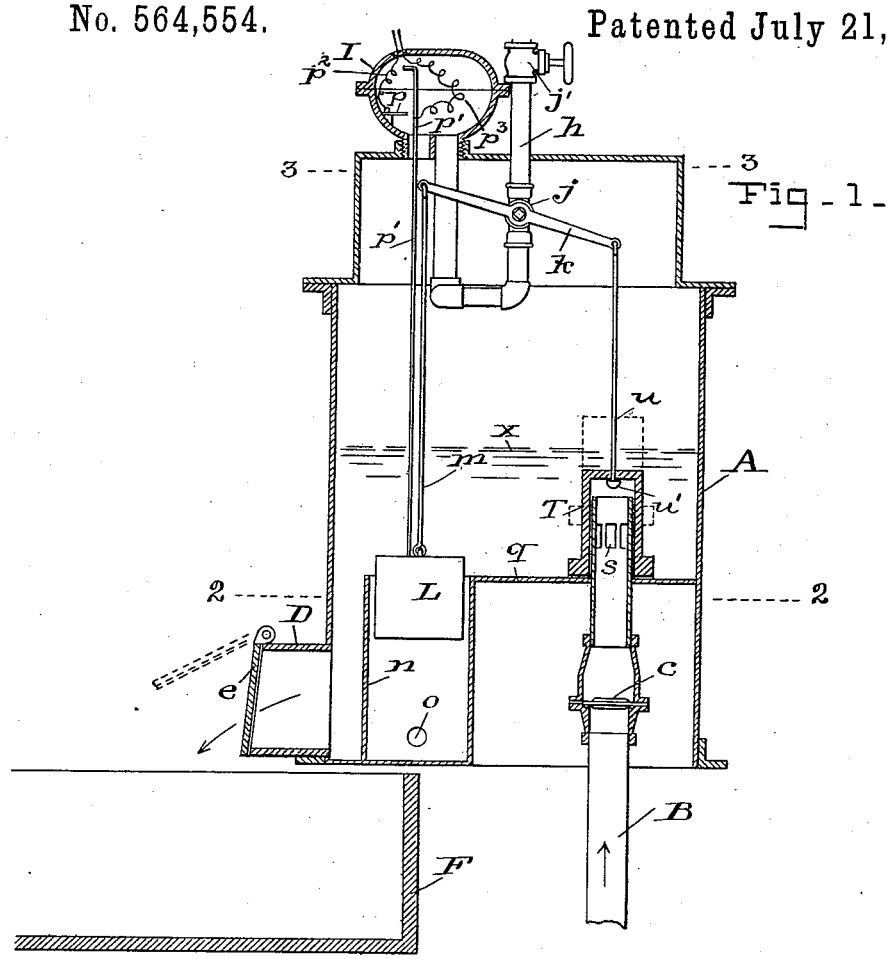
Fig. 1.
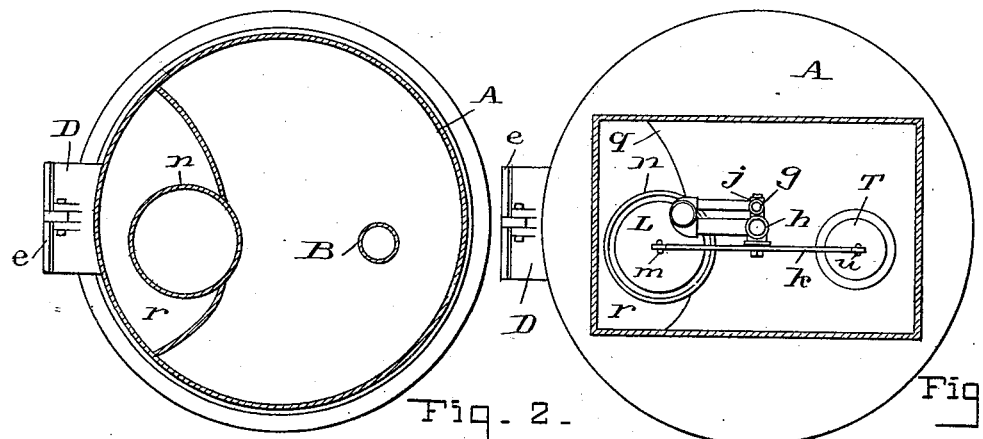
Fig. 2.
Fig. 3.
WITNESSES:
Lee I. Van Horn.
Charles B. Mann Jr.
INVENTOR:
Edw. J. Byrne
By Chas. B. Mann
ATTORNEY.

(No Model.) 2 Sheets—Sheet 2.
E. J. BYRNE.
APPARATUS FOR PRODUCING VACUUM.
No. 564,554. Patented July 21, 1896.
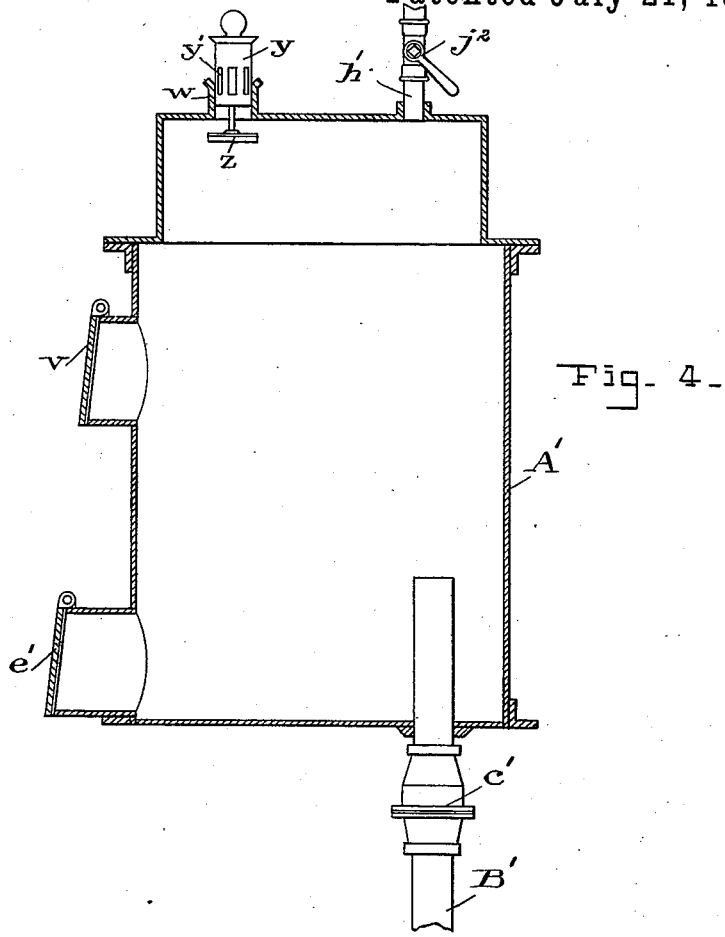
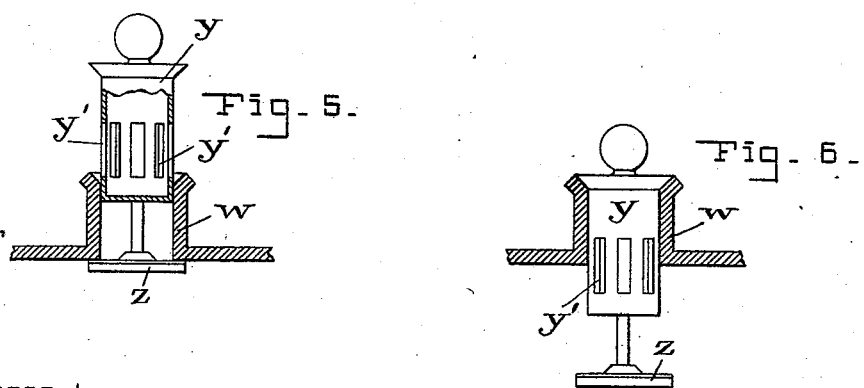
WITNESSES:
Lee J. Van Horn
Charles B. Mann Jr.
INVENTOR:
Edw. J. Byrne
By Chas. B. Mann
ATTORNEY.

UNITED STATES PATENT OFFICE.

EDWARD J. BYRNE, OF BALTIMORE, MARYLAND, ASSIGNOR TO CLARENCE M. KEMP, OF SAME PLACE.

APPARATUS FOR PRODUCING VACUUM.

SPECIFICATION forming part of Letters Patent No. 564,554, dated July 21, 1896.

Application filed November 18, 1895. Serial No. 569,269. (No model.)

*To all whom it may concern:*

Be it known that I, EDWARD J. BYRNE, a citizen of the United States, residing at Baltimore, in the State of Maryland, have invented certain new and useful Improvements in Apparatus for Producing a Vacuum, of which the following is a specification.

This invention relates to an apparatus for producing a vacuum or partial vacuum through the agency of gases exploded in a closed vessel, whereby liquid of any kind, such as oil, water, or mud, may be raised.

The object of the invention is to provide a new pumping or lifting apparatus which shall operate to raise liquids of any kind into a receiver by the operation of explosions made in a closed vessel.

In order to make my invention clearly understood, I have shown in the accompanying drawings certain means for carrying the same into practical effect without, however, intending to limit the invention to the particular construction which, for the sake of illustration, I have set forth.

Referring to the drawings, Figure 1 is a vertical section of the apparatus. Fig. 2 is a horizontal cross-section on the line 2 2. Fig. 3 is a horizontal cross-section on the line 3 3. Fig. 4 is a vertical section of a modified form of apparatus. Fig. 5 is a view of the igniting device seen in Fig. 4 in one position. Fig. 6 is a view of the igniting device in the position it takes for producing an explosion.

The letter A designates a vessel or receiver which is normally closed or tight. An inlet-pipe or suction-pipe B is connected with this vessel and preferably rises up through the bottom thereof. This pipe has a check-valve $c$, which allows the water or any other liquid that is to be raised to pass freely upward, but prevents it from returning. It is understood that this pipe may extend downward to any supply or body of liquid which it is desired to elevate. The vessel has an outlet or water-discharge nozzle D, which preferably is of larger size than the inlet or suction pipe. This outlet is closed by a suitable automatic or gravity valve, here shown in the form of a flap-valve $e$. The water passing from this outlet or nozzle delivers into a suitable tank F.

The check-valve $c$ and the valve $e$ close the only two openings which the receiver vessel has.

The vacuum or partial vacuum is produced within the closed vessel A by exploding gases in the vessel and allowing the sudden expansion thus created to vent to the atmosphere freely through a valve, (in Fig. 1 the valve $e$,) which immediately closes after such venting, thereby creating in the vessel a partial vacuum, which will induce a suction of liquid through the inlet-pipe B. Air and gas inlets are provided to supply the receiver with these explosive elements. To this end a gas-supply pipe $g$ and an air-supply pipe $h$ enter the closed vessel and lead to a mixing-pipe and to the dome I, Fig. 1, which is open only to the vessel and in free communication therewith. Instead of two separate inlets for the air and gas, one inlet for a mixture of air and gas can be used. By these means the vessel A may be charged with an explosive mixture of air and gas. A gas-pipe has a cock $j'$, by means of which the supply may be entirely cut off. A key-valve $j$ or double valve controls the passage-way of both the air and gas pipes, and a lever $k$, connected with said key-valve, enables the two valves to be opened and closed. These valves may be operated by hand or automatically. In Fig. 1 means are shown for this operation. These consist of a combined weight and float L, and a rod $m$, connecting the same with the valve-lever $k$. The weight and float is a body L, slightly buoyant, of suitable material to serve both purposes. It may be made of cork weighted, or it may be an air-tight cylinder of sheet-metal weighted.

In the bottom of the receiver A is a platform $q$, extending over a considerable portion of the cross-area of the receiver, but leaving a descending space $r$, where the nozzle D and valve $e$ are located. A well $n$ is in the receiver. This well comprises an upright cylinder, open at the top, which latter is even or level with the platform $q$, and is provided with a small hole $o$ in its side, near the bottom, to allow water in the well to flow out into the descending space $r$. The body L rises and lowers in this well. The suction-pipe B rises up through the platform $q$ and projects above the latter. A cap T sets down over the upward-projecting end of the suction-pipe. Holes $s$ must be either in the side of the pipe or in the side of the cap. In the present instance the holes are in the pipe. When the cap is down, the said holes $s$ are closed. This cap has in its top a hole through which a rod $u$ passes loosely, said rod at its lower end and within the cap having a knob or head $u'$. This rod connects the cap T with the valve-lever $k$. The cap T may be lifted up without moving the rod $u$. When the body L, valve-lever, and cap T are in the position shown in Fig. 1, the valves $j$ of the air and gas pipes are open, the receiver has just received a charge of water, the cap T has just closed down around the side holes $s$, and everything is in condition for the water in the receiver to discharge at $e$.

The body L has a greater weight than the cap T. Consequently when there is no water in the reservoir or in the well, the greater weight of the body L will tilt the valve-lever $k$ to the closed position and lift the cap. After an explosion a vacuum is instantly formed in the receiver, whereupon the water will rush up the suction-pipe B and pass through the holes $s$, and the uprush of the water will retain the cap in its elevated position, as indicated by broken lines in Fig. 1. The water passes into the space $r$ and well $n$, and, rising steadily, fills the receiver A to line $x$. This line $x$ is not always at the same elevation. Sometimes it is higher and at other times lower, depending upon the vacuum produced after each explosion. While the water is coming into receiver A the float A stays down, as it has not buoyancy sufficient in itself to rise and actuate the lever $k$; but as soon as the water ceases passing through holes $s$ in the pipe B the cap T will fall, and the weight of this cap, added to the buoyancy of the float L, will cause the latter to rise and actuate lever $k$ and thus open the gas and air valves $j$. The entrance of air and gas will bring a pressure to bear on the water in the receiver and said water will then discharge at the valve $e$.

In the construction shown in Fig. 1 the mixed gas and air is ignited in the dome I, and the explosion passes therefrom to the vessel A. Suitable means are employed to produce a spark or to cause ignition and explosion of the gases. In the present instance, in Fig. 1, this comprises an electric sparker. A contact-piece $p$ is fixed in the dome and connects with an electric conductor-wire $p^2$. A movable contact-piece $p'$, also in the dome, is arranged to make and break contact with $p$. When contact is broken, a spark is produced. This movable piece is connected with either the valve-lever rod $m$ or body L, this connection serving to impart the desired movement. A conductor-wire $p^3$ is connected with the piece $p'$ or to any part of the receiver.

The operation is as follows: The position of the parts seen in Fig. 1 is that which they would have after an explosion and when the water has rushed into the receiver A, filling it, say, up to the line $x$. The air and gas valves $j$ being open, the valve $e$ would then open and the water discharge into the tank F. While this water or other liquid can freely discharge through valve $e$, that which is in the well $n$, under the float-body L, can discharge only slowly through the small hole $o$. Consequently the body L will be temporarily kept up and its lowering movement will be slow. Thus the valves $j$ are kept open to continue the admission of gas and air, so as to insure the exhaustion of the water from the space $r$. When the water in the well $n$ has run out, the body L will have lowered and moved lever $k$ and raised cap T, and the valves $j$ will be closed and the movable contact-piece $p'$ will break connection from contact-piece $p$ and the electric spark thereby produced will ignite the gas and air and an explosion will follow, the valve $e$ will be blown open momentarily to relieve the receiver of the force of the exploded gases, and instantly a strong vacuum is created in the receiver, which will hold the valve $e$ tightly to its seat and cause a suction of liquid through the pipe B.

Referring to Fig. 4, the receiver A', suction-pipe B', and liquid-discharge valve $e'$ are the same as in Fig. 1. The suction-pipe at the enlarged part $c'$ contains a check-valve, same as in Fig. 1. This is a simplified form of apparatus, but will produce the same results. Gas and air supply pipes $h'$ have a cock or valve $j^2$, which latter may be opened and closed by hand. To relieve the expansion and give vent when an explosion occurs, the receiver may have an extra valve $v$. A suitable electric-spark device may be employed to cause an explosion, or an igniter like that shown may be used. This igniter comprises an open tubular part $w$ in the top of the receiver, and a small flash-pot $y$, which slides up and down in the tubular part. This pot has side slots or holes $y'$. A stem projects down below the bottom of the pot, and a valve $z$ on the stem serves to close the open tubular part $w$ when the pot is raised, as in Fig. 5. When an explosion takes place, the pot is raised and the valve closed automatically.

In order to ignite the gas mixture in the vessel A, a small quantity of alcohol or naphtha is placed in the pot $y$ and fired through the side openings, and while afire the pot is pushed downward to the position seen in Fig. 6, whereupon an explosion ensues, a vacuum is created, and thereby liquid is sucked into the receiver.

Having thus described my invention, what I claim is—

1. In an apparatus for producing a vacuum or partial vacuum by explosions of gas, the combination of a closed vessel wherein the explosions are produced; a suction-pipe leading into said vessel; a discharge from the vessel provided with an automatic valve; air and gas supply pipes opening into the said vessel and provided with valves; a body within the vessel which acts both as a weight and a float; connections between the said air and gas valves and the said body, whereby said valves will be opened by the inflow of material through the suction-pipe and closed by the discharge of said material from the vessel; and means to ignite the said mixed air and gas and cause an explosion.

2. In an apparatus for producing a vacuum or partial vacuum by explosions of gas, the combination of a closed vessel within which the explosions are produced; a suction-pipe leading into said vessel; a discharge from the vessel provided with an automatic valve; air and gas supply pipes opening into the said vessel and provided with valves; a body within the vessel which acts both as a weight and a float; a lever attached to the air and gas valves; and a rod connecting the said body and said lever, whereby the inflow of material through the suction-pipe will cause the air and gas valves to be opened and said valves will be closed by the discharge of said material from the vessel.

3. In an apparatus for producing a vacuum or partial vacuum, by explosions of gas, the combination of a closed vessel within which the explosions are produced; a suction-pipe leading into said vessel; a discharge from the vessel provided with an automatic valve; air and gas supply inlets opening into the vessel; an igniter device to fire the mixed air and gas and cause an explosion; a body within the vessel which acts both as a weight and a float; and connections between said igniter device and the weight and float whereby the igniter is operated, as and for the purpose described.

4. In an apparatus for producing a vacuum or partial vacuum, the combination of a closed vessel; a suction-pipe leading into said vessel; a discharge from the vessel provided with an automatic valve; air and gas supply inlets opening into the vessel and provided with valves; a body within the vessel which acts both as a weight and a float; a lever connected with said valves; a movable cap which is over the end of the suction-pipe; connections from the said lever to both the body and the cap; and means whereby to ignite the air and gas in the vessel and produce an explosion.

5. In an apparatus for producing a vacuum or partial vacuum, the combination of a closed vessel; a suction-pipe leading into said vessel; a discharge from the vessel provided with an automatic valve; air and gas supply inlets opening into the vessel and provided with valves; a well in the vessel provided with a discharge-orifice; a body within the vessel which acts both as a weight and a float and raises and lowers in the said well; connections between said valves and the weight and float; and means to ignite the said mixed air and gas and cause an explosion.

In testimony whereof I affix my signature in the presence of two witnesses.

EDWARD J. BYRNE.

Witnesses:
CHARLES B. MANN, Jr.,
C. CALVERT HINES.